United States Patent Office.

JAMES HUNTER, OF PHILADELPHIA, PENNSYLVANIA.

Letters Patent No. 99,904, dated February 15, 1870.

IMPROVEMENT IN OBTAINING MADDER EXTRACT.

The Schedule referred to in these Letters Patent and making part of the same.

*To all whom it may concern:*

Be it known that I, JAMES HUNTER, of the city of Philadelphia, in the State of Pennsylvania, have invented a new and useful Process of Obtaining Pure Madder Extract from Ground Madder-Root; and I do hereby declare that the following is a full, clear, and exact description thereof, which will enable others skilled in the art to which it appertains to practice my invention.

Heretofore I have treated madder-root with sulphuric acid before digesting it, but I have found that there are in the madder-root insoluble compounds, of which lime, magnesia, &c., are the bases, and that, when sulphuric acid is used it forms insoluble sulphates which unite with the coloring matter.

By means, however, of a preliminary treatment with hydrochloric acid, soluble salts of lime, magnesia, &c., are formed, which can be washed out before treating the madder with sulphuric acid.

I treat the ground madder with about ten per cent. of its weight of hydrochloric acid diluted with water, and raised to, or nearly to the boiling point. This dissolves the salts of lime, magnesia, or other bases which are combined with the coloring matter of the madder in the form of insoluble compounds.

The madder is then washed, in order to remove the acid and substances which it holds in solution, and is next treated with from twenty-five to forty per cent. of its weight of sulphuric acid diluted with three or four times its own weight of water, and is boiled for two or three hours, so as to clear the woody fiber and resinous substances.

It is then washed, after which, the coloring matter being uncombined with insoluble salts and readily soluble in hot water, it is introduced into a close digester, and treated with water at a high temperature, under a pressure of from thirty to ninety pounds per square inch.

This digester is provided with a filter, which separates the woody fiber and earthy or sandy matter from the coloring matter, and the solution is then drawn off into another vessel and cooled until the coloring matter is deposited in the form of a flocky precipitation.

What I claim as my invention, and desire to secure by Letters Patent, is—

The treatment of madder-root, first with hydrochloric and next with sulphuric acid, and then with heated water, in a close digester under pressure.

JAMES HUNTER.

Witnesses:
WM. R. WRIGHT,
WM. J. BURNS.